DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 10

T903,025
NOVEL PHOTOGRAPHIC COUPLERS

Delwyn E. Machiele, % Eastman Kodak Co.,
Kodak Park, Rochester, N.Y. 14650

Filed Feb. 18, 1972, Ser. No. 227,668
Int. Cl. G03c *1/40, 5/54, 7/32*
U.S. Cl. 96—100
No Drawing. 28 Pages Specification

A class of 5-acyl-2,4-oxazolidinediones of the general formula

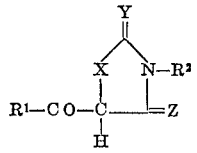

in which

X, Y and Z are each defined as oxygen or sulfur;
$R^1$ represents an aryl, an alkyl, a heterocyclic group, —NHR and —OR group in which R is defined as hydrogen, an aryl, an alkyl, or a heterocyclic radical;
$R^2$ is a hydrogen, an aryl group, an alkyl group, or a heterocyclic group;

said class of compounds having the ability to react with oxidized color developer to obtain photographically useful yellow dyes; the non-diffusible compounds of this invention being preferably utilized in a color photographic element as part of one or more light-sensitive silver halide emulsion layers and the diffusible compounds utilized by incorporation into a developer composition; also included is a process for producing the indicated compounds by reacting a 2,4 oxazolidinedione or thio analog thereof with magnesium methyl carbonate, and, thereafter, reacting the resulting chelate salt with an acylating agent or subjecting it to alcoholysis.